(12) United States Patent
Nakazawa (10) Patent No.: US 9,292,806 B2
(45) Date of Patent: Mar. 22, 2016

(54) APPARATUS, METHOD, AND PROGRAM FOR MANAGING NETWORK INSTRUMENT CONNECTED TO NETWORK

(75) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1480 days.

(21) Appl. No.: 11/415,246

(22) Filed: May 2, 2006

(65) Prior Publication Data

US 2006/0259317 A1 Nov. 16, 2006

(30) Foreign Application Priority Data

May 12, 2005 (JP) ................................. 2005-140004

(51) Int. Cl.
*G06F 15/16* (2006.01)
*G06Q 10/06* (2012.01)
*G06F 3/12* (2006.01)

(52) U.S. Cl.
CPC .............. *G06Q 10/06* (2013.01); *G06F 3/1229* (2013.01); *G06F 3/1236* (2013.01); *G06F 3/1257* (2013.01); *G06F 3/1285* (2013.01)

(58) Field of Classification Search
CPC ... G06F 3/1229; G06F 3/1236; G06F 3/1257; G06F 3/1285; G06Q 10/06
USPC ......................................... 709/220, 223, 224
See application file for complete search history.

(56) References Cited

U.S. PATENT DOCUMENTS

| | | | | |
|---|---|---|---|---|
| 4,864,492 A | * | 9/1989 | Blakely-Fogel et al. | 706/45 |
| 5,475,819 A | * | 12/1995 | Miller et al. | 709/203 |
| 5,774,689 A | * | 6/1998 | Curtis et al. | 703/21 |
| 5,897,635 A | * | 4/1999 | Torres et al. | |
| 5,987,225 A | * | 11/1999 | Okano | 358/1.13 |

(Continued)

FOREIGN PATENT DOCUMENTS

| | | |
|---|---|---|
| EP | 1 085 694 A2 | 3/2001 |
| JP | 2000-163344 | 6/2000 |

(Continued)

OTHER PUBLICATIONS

English machine translation of JP2002-190809.*

(Continued)

*Primary Examiner* — Krista Zele
*Assistant Examiner* — Anthony Fabbri
(74) *Attorney, Agent, or Firm* — Fitzpatrick, Cella, Harper & Scinto (57) ABSTRACT

An information processing apparatus for managing a network instrument connected to a network is disclosed. This apparatus includes a storage device storing setting information of a network instrument as a management target, a receiving device receiving the setting information of the network instrument, a comparing device comparing the setting information stored in the storage device with the setting information received from the network instrument, a setting device overwriting the setting information stored in the storage device on setting of the network instrument if the setting information stored in the storage device is different from the setting information received from the network instrument as a result of comparison by the comparing device, and a priority setting device setting a network instrument which gives priority on the setting information in the storage device and a network instrument which gives no priority on the setting information in the storage device.

7 Claims, 9 Drawing Sheets

(56) References Cited

U.S. PATENT DOCUMENTS

| | | | |
|---|---|---|---|
| 6,052,724 A * | 4/2000 | Willie et al. | 709/223 |
| 6,081,806 A * | 6/2000 | Chang et al. | 707/8 |
| 6,102,965 A * | 8/2000 | Dye et al. | 717/109 |
| 6,195,689 B1 * | 2/2001 | Bahlmann | 709/217 |
| 6,216,135 B1 * | 4/2001 | Brodersen et al. | 707/201 |
| 6,226,650 B1 * | 5/2001 | Mahajan et al. | 707/201 |
| 6,243,715 B1 * | 6/2001 | Bogantz et al. | 707/201 |
| 6,349,304 B1 * | 2/2002 | Boldt et al. | |
| 6,438,563 B1 * | 8/2002 | Kawagoe | 707/201 |
| 6,452,692 B1 * | 9/2002 | Yacoub | 358/1.15 |
| 6,466,972 B1 * | 10/2002 | Paul et al. | 709/222 |
| 6,480,901 B1 * | 11/2002 | Weber et al. | 709/246 |
| 6,694,337 B1 * | 2/2004 | King et al. | 707/201 |
| 6,701,359 B1 * | 3/2004 | Calabrez et al. | 709/223 |
| 6,718,348 B1 * | 4/2004 | Novak et al. | 707/201 |
| 6,748,379 B2 | 6/2004 | Martin, Jr. | |
| 6,757,821 B1 * | 6/2004 | Akiyama et al. | 713/100 |
| 6,996,070 B2 * | 2/2006 | Starr et al. | 370/252 |
| 7,047,088 B2 * | 5/2006 | Nakamura et al. | 700/19 |
| 7,146,413 B2 * | 12/2006 | Spitzer | G06F 3/1204 358/1.15 |
| 7,376,720 B2 * | 5/2008 | Fujii | G06F 8/65 709/220 |
| 2002/0052938 A1 * | 5/2002 | Kanemitsu | H04L 41/0253 709/220 |
| 2002/0089683 A1 * | 7/2002 | Moro | G06K 15/00 358/1.13 |
| 2002/0161740 A1 | 10/2002 | Nakamura et al. | |
| 2002/0188701 A1 * | 12/2002 | Brown | G06F 9/44505 709/220 |
| 2003/0069947 A1 * | 4/2003 | Lipinski | H04L 29/06 709/220 |
| 2003/0212768 A1 * | 11/2003 | Sullivan | H04L 69/329 709/220 |
| 2004/0098471 A1 * | 5/2004 | Shima | H04L 12/24 709/221 |
| 2004/0193745 A1 * | 9/2004 | Olbricht | G06F 3/1204 710/8 |
| 2006/0190574 A1 * | 8/2006 | Yoshikawa | G06F 3/1222 709/221 |
| 2006/0224707 A1 * | 10/2006 | Kawai | H04L 41/0803 709/220 |
| 2007/0083621 A1 * | 4/2007 | Nuggehalli | G06F 3/1204 709/221 |
| 2007/0171463 A1 * | 7/2007 | Ishimura | G06K 15/00 358/1.15 |

FOREIGN PATENT DOCUMENTS

| | | | |
|---|---|---|---|
| JP | 2001-086118 A | | 3/2001 |
| JP | 2002-190809 | * | 7/2002 |
| JP | 2002-190809 A | | 7/2002 |
| JP | 2002190809 A | * | 7/2002 |
| WO | 01/73558 A1 | | 10/2001 |

OTHER PUBLICATIONS

Japanese Office Action in corresponding Japanese Application No. 2005-140004, dated Jun. 6, 2008.

* cited by examiner

- 401 ☑ NETWORK SETTING
  - 402 ☑ IP ADDRESS/SUBNET MASK
  - 403 ☑ GATEWAY ADDRESS
  - 404 ☐ DNS SERVER ADDRESS

- 405 ☐ INSTRUMENT INFORMATION
  - 406 ☐ INSTRUMENT NAME
  - 407 ☐ INSTALLATION LOCATION

- 408 ☑ NOTIFICATION SETTING
  - 409 ☑ SMTP SERVER ADDRESS
  - 410 ☑ SMTP TRANSMISSION SOURCE ADDRESS

OK 411    CANCEL 412

☑ OPTION 1

NETWORK INSTRUMENT LIST

| | IP ADDRESS | INSTRUMENT NAME | STATE | PRODUCT NAME |
|---|---|---|---|---|
| 701 ☑ | 192.168.0.10 | FIRST SALES SECTION LBP | PRINTABLE | PRT-1234 |
| 702 ☐ | 192.168.0.14 | FIRST SALES SECTION COLOR | PRINTABLE | Color PRT-800 |
| 703 ☑ | 192.168.0.21 | SECOND SALES SECTION LBP | ERROR | PRT-1233 |
| 704 ☑ | 192.168.0.24 | SECOND SALES SECTION A4 PRINTER | PRINTABLE | PRT-3454 |
| 705 ☐ | 192.168.0.55 | ACCOUNTANT SECTION MFP | WARNING | MFP 80 |
| 706 ☑ | 192.168.0.230 | GENERAL AFFAIRS SECTION HIGH-SPEED PRINTER | PRINTABLE | PRT-2623 |

OK ~707    CANCEL ~708

NETWORK INSTRUMENT SETTING

TCP/IP
- IP ADDRESS: 192.168.0.11 — 901
- GATEWAY ADDRESS: 192.168.0.1 — 902
- SUBNET MASK: 255.255.255.0 — 903

INSTRUMENT INFORMATION
- INSTRUMENT NAME: GENERAL AFFAIRS SECTION LBP — 904
- INSTALLATION LOCATION: GENERAL AFFAIRS OA CORNER — 905

907 — OK    CANCEL — 908

APPARATUS, METHOD, AND PROGRAM FOR MANAGING NETWORK INSTRUMENT CONNECTED TO NETWORK

This application claims the benefit of Japanese Application No. 2005-140004, filed May 12, 2005, which is hereby incorporated by reference herein in its entirety.

FIELD OF THE INVENTION

The present invention relates to an apparatus, method, and program for managing and setting a network instrument connected to a network.

BACKGROUND OF THE INVENTION

Conventionally, apparatuses, methods, and programs for managing and setting a network instrument connected to a network are known. There are an apparatus, method, and program which acquire various kinds of management information such as setting information from a network instrument as a management target by using a standard protocol such as SNMP (Simple Network Management Protocol) or a unique protocol, save the information in a storage device such as a database, monitor the state of the network instrument to be managed, and execute display or notification of error information.

In such network instrument management, it is necessary to ensure consistency between the management information in the network instrument to be managed and the target instrument's management information which is stored in the management system. Conventionally, as described in, e.g., Japanese Patent Laid-Open No. 2000-163344, when a management system accesses a network instrument to be managed, an access log is stored in both the storage area in the management system and that in the management target instrument. By comparing the access logs, the management target instrument's management information which is stored in the management system or the management information in the management target instrument is updated.

In the above-described conventional technique, however, the network instrument to be managed must have the storage area to save the management information access log. For an instrument without such a function and area, no method of preventing inconsistency of management information is provided.

Additionally, the above-described conventional technique does not assume that the management information of the network instrument to be managed be changed from the outside of the management system, e.g., from the operation panel of the network instrument, internal Web page, or dedicated setting change tool. If such unexpected change has been done, the management information about the management target instrument, which is stored in the management system, is updated by the management target instrument information. Hence, the system cannot cope with careless or malicious change of the management information of the management target instrument.

SUMMARY OF THE INVENTION

According to the present invention, the foregoing problem is solved by providing an information processing apparatus for managing a network instrument connected to a network, comprising:

a storage device which stores setting information of a network instrument as a management target;

a receiving device which receives the setting information of the network instrument;

a comparing device which compares the setting information stored in the storage device with the setting information received from the network instrument; and a setting device which overwrites the setting information stored in the storage device on setting of the network instrument if the setting information stored in the storage device is different from the setting information received from the network instrument as a result of comparison by the comparing device.

According to the present invention, the foregoing problem is solved by providing an information processing method of managing a network instrument connected to a network, comprising:

a storage step of storing setting information of a network instrument as a management target;

a receiving step of receiving the setting information of the network instrument;

a comparing step of comparing the setting information stored in the storage step with the setting information received from the network instrument; and a setting step of overwriting the setting information stored in the storage step on setting of the network instrument if the setting information stored in the storage step is different from the setting information received from the network instrument as a result of comparison in the comparing step.

According to the present invention, the foregoing problem is solved by providing an information processing program for managing a network instrument connected to a network, the program causing a computer to execute:

a storage step of storing setting information of a network instrument as a management target;

a receiving step of receiving the setting information of the network instrument;

a comparing step of comparing the setting information stored in the storage step with the setting information received from the network instrument; and a setting step of overwriting the setting information stored in the storage step on setting of the network instrument if the setting information stored in the storage step is different from the setting information received from the network instrument as a result of comparison in the comparing step.

Other features and advantages of the present invention will be apparent from the following description taken in conjunction with the accompanying drawings, in which similar reference characters designate the same or similar parts throughout the figures.

DETAILED DESCRIPTION OF THE PREFERRED EMBODIMENTS

Preferred embodiments of the present invention will now be described in detail with reference to the accompanying drawings. It should be noted that the relative arrangement of the components, the numerical expressions and numerical values set forth in these embodiments do not limit the scope of the present invention unless it is specifically stated otherwise.

FIRST EMBODIMENT

Figure 1:
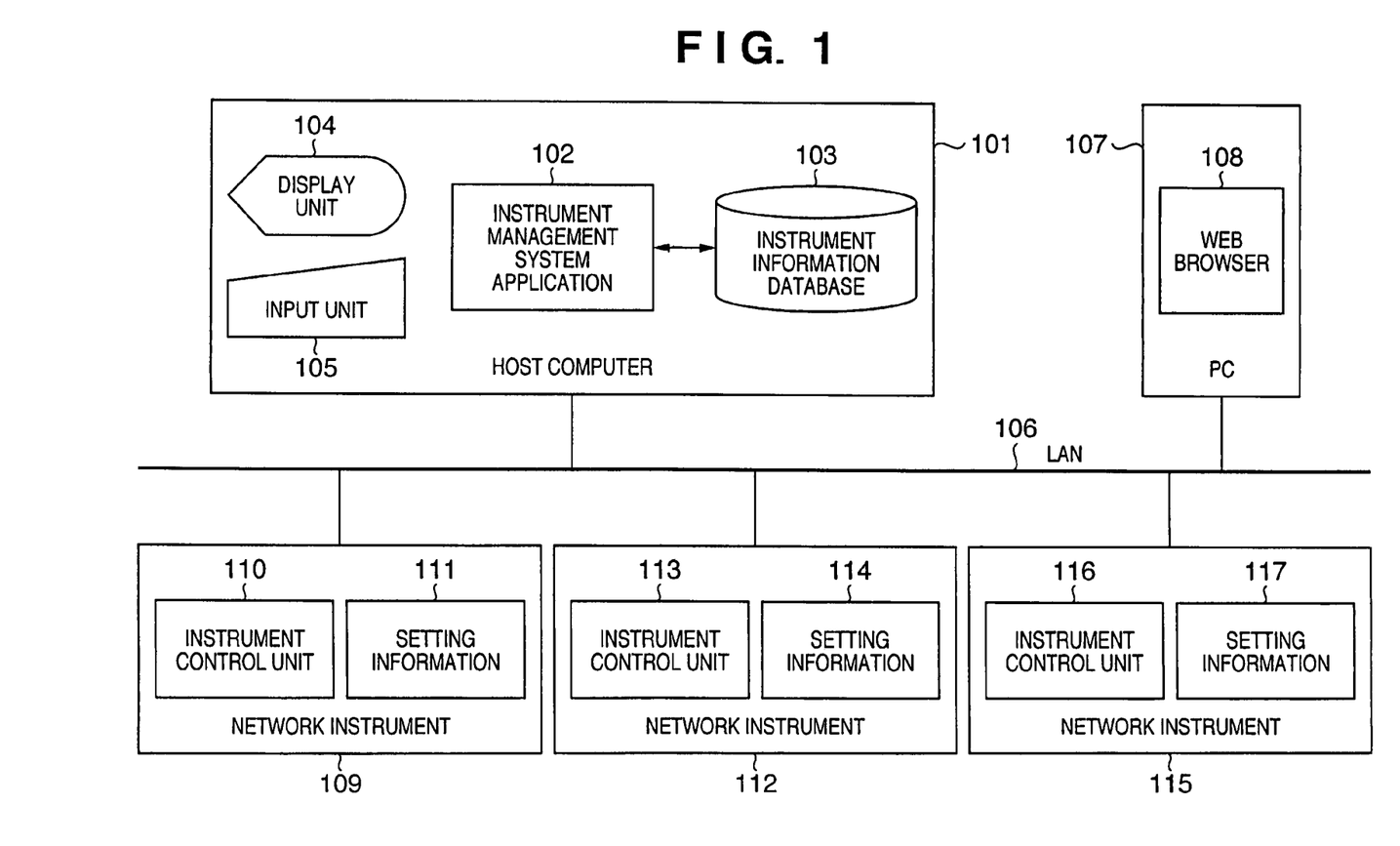
FIG. 1 is a block diagram showing the configuration of a network system according to the first embodiment of the present invention.

FIG. 1 is a block diagram showing a network system including a host computer serving as an information processing apparatus according to the first embodiment of the present invention.

Referring to FIG. 1, an instrument management system application 102 runs on a host computer 101. An instrument information database 103 serves as a storage device to store various kinds of information including the setting information of each instrument connected to the network. An operation window and various kinds of information are displayed on a display unit 104 and manipulated by an input unit 105 such as a keyboard or mouse. In the illustrated example, the instrument information database 103 operates on the same host as that for the instrument management system application 102. However, the instrument information database 103 may be connected to a database set on another host through a LAN 106.

If the instrument management system application 102 is built as a system that operates on a Web server, the instrument management system application 102 can be operated through a Web browser 108 that runs on a PC 107 connected to the LAN 106.

Network instruments 109, 112, and 115 are management targets of the instrument management system application 102 and include instrument control units 110, 113, and 116 and storage devices to hold setting information 111, 114, and 117, respectively. The network instruments 109, 112, and 115 need not always be devices of the same type. Examples of the network instruments 109, 112, and 115 are a printer and a multifunctional peripheral connected to the network.

Figure 2:
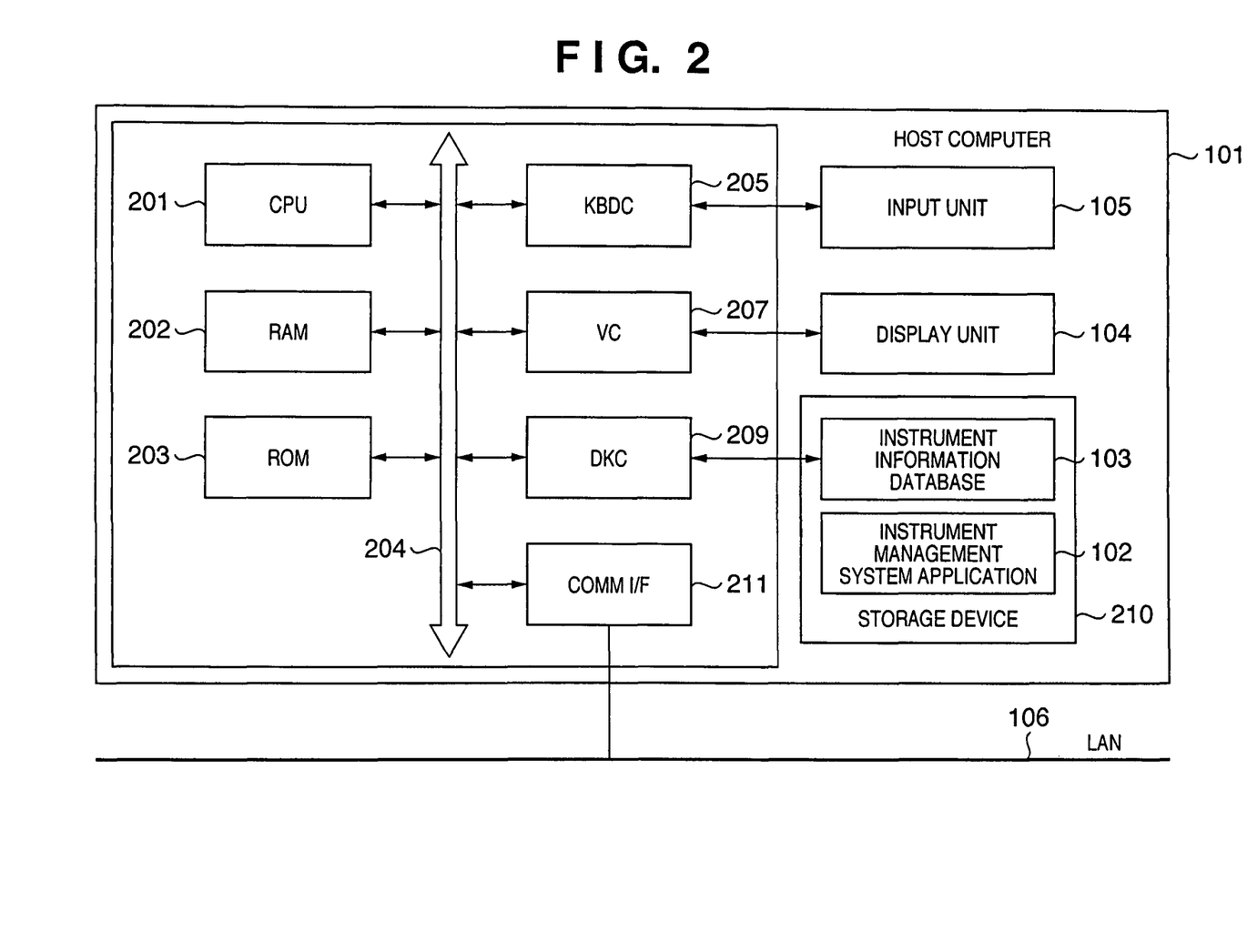
FIG. 2 is a block diagram showing the hardware configuration of a host computer according to the first embodiment.

FIG. 2 is a block diagram showing the hardware configuration of the host computer 101.

The host computer 101 comprises a CPU 201, RAM 202, ROM 203, and storage device 210. The storage device 210 stores an operating system (not shown), the instrument information database 103, and the software of the instrument management system application 102. The CPU 201 executes software stored in the ROM 203 or storage device 210 to systematically control devices connected to a system bus 204. The RAM 202 functions as a main memory or work area of the CPU 201. The storage device 210 including, e.g., a hard disk stores a boot program, operating system, various kinds of applications including the network instrument management system, database data, font data, user files, and the like.

In the host computer 101, a keyboard controller (KBDC) 205 sends input information from a keyboard (KBD) or pointing device serving as the input unit 105 to the CPU 201. A video controller (VC) 207 controls display on the display unit 104 including a CRT or LCD. A disk controller (DKC) 209 controls access to the storage device 210. The host computer 101 is connected to the network 106 through a communication controller (COMM I/F) 211. By executing a predetermined program, the CPU 201 functions as a comparing device which compares setting information stored in the instrument information database 103 with setting information received from a network instrument on the LAN 106 or a setting device which, if the setting information stored in the instrument information database 103 is different from that received from the network instrument a result of comparison by the comparing device, overwrites the setting information stored in the instrument information database 103 on the setting of the network instrument. The communication controller 211 functions as a receiving device to receive the setting information of a network instrument.

Figure 3:
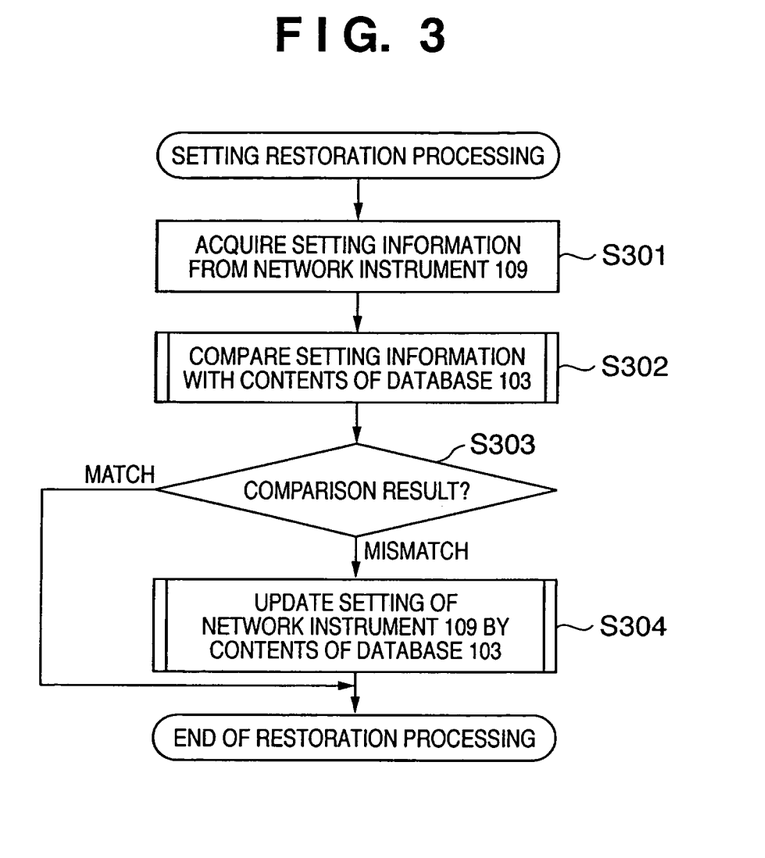
FIG. 3 is a flowchart showing the outline of processing of causing an instrument management system application to restore the setting information of a network instrument as a management target by using setting information stored in an instrument information database.

FIG. 3 is a flowchart showing the outline of processing of causing the instrument management system application 102 to restore the setting information of the network instrument 109 as a management target by using setting information stored in the instrument information database 103. Assume that the normal setting information of the network instrument 109 is saved in the instrument information database 103.

In the setting restoration processing, in step S301, the setting information 111 of the network instrument 109 to be managed is acquired by using a protocol such as SNMP. In step S302, the acquired setting information 111 of the network instrument 109 is compared with the setting information of the network instrument 109, which is stored in the instrument information database 103. If the pieces of setting information do not match as a result of comparison, the setting information 111 of the network instrument 109 is updated by the setting information in the instrument information database 103 in step S304.

The instrument management system application 102 can, e.g., 1. execute the setting restoration processing for a selected management target network instrument in accordance with an instruction from the user, 2. execute the setting restoration processing for all management target network instruments in accordance with an instruction from the user, 3. execute the setting restoration processing for all management target network instruments at time designated by the user, or 4. execute the setting restoration processing for all management target network instruments repeatedly at a time interval set by the user or system.

Figure 4:
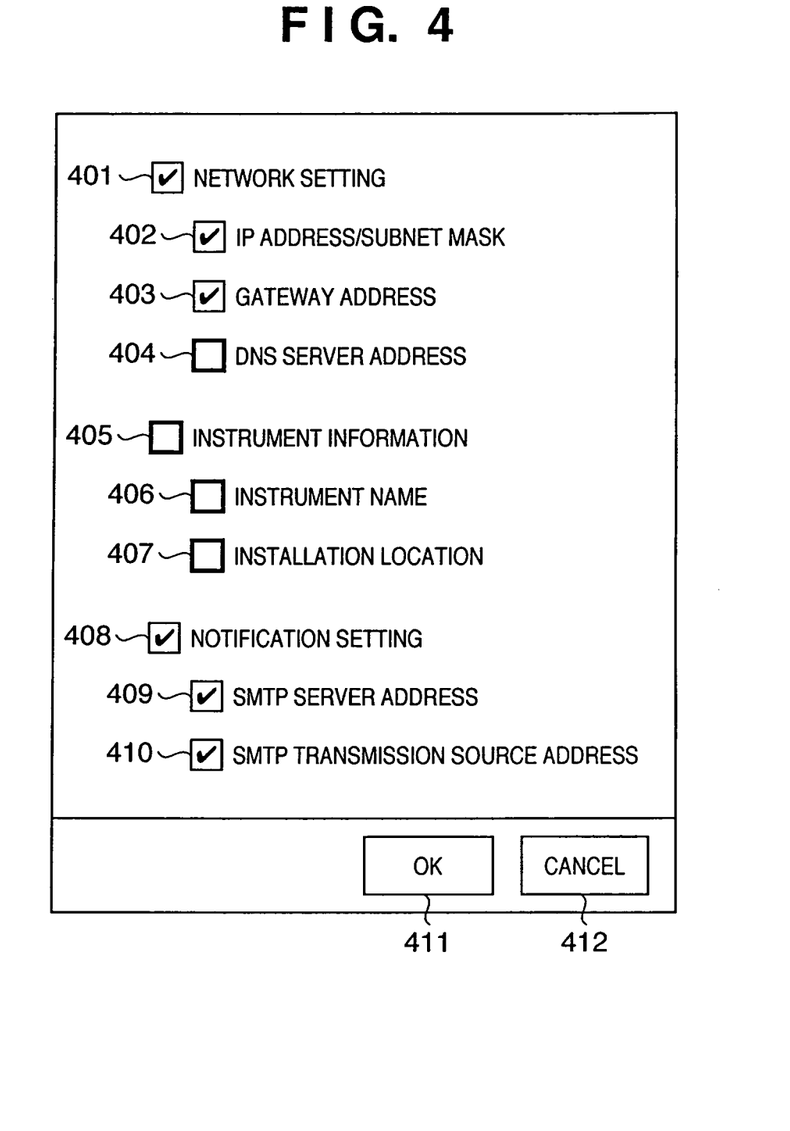
FIG. 4 is a view showing a window to select setting information comparison items.

FIG. 4 is a view showing an example of a window to select setting information comparison items. Which setting item stored in the instrument information database 103 is to be compared with which setting item set in a network instrument can be determined by the window shown in FIG. 4.

Referring to FIG. 4, items are classified into three groups: network setting 401, instrument information 405, and notification setting 408, each of which includes detailed setting items. When the check contents of a group item, e.g., the notification setting 408 change, an SMTP server address 409 and an SMTP transmission source address 410 synchronously become selectable (with a checkmark in the notification setting 408) or unselectable (without a checkmark in the notification setting 408). For example, since the instrument information 405 in FIG. 4 has no checkmark, operations for an instrument name 406 and installation location 407 as child elements are inhibited. If an item is selected, like the network setting 401, its child elements can individually be selected. In the example shown in FIG. 4, an IP address/subnet mask 402 and gateway address 403 of the network setting 401 are selected, although a DNS server address 404 is not selected.

When a cancel button 412 is clicked on, the instrument management system application 102 discards all inputs and closes the setting window. When an OK button 411 is clicked on, the instrument management system application 102 reads the check state of each item on the window and stores each selected element as a comparison target item.

In this embodiment, setting items to be updated can also be selected in addition to the setting items to be compared. The setting window and operation for that are the same as in the above description using FIG. 4, and a detailed description thereof will be omitted.

Figure 5:
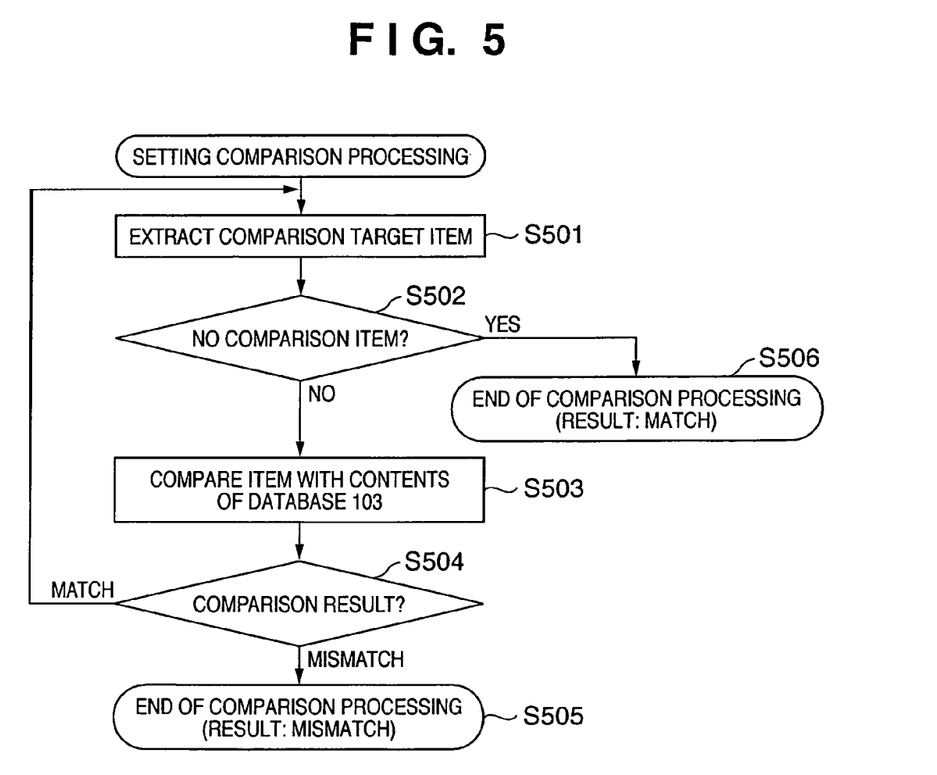
FIG. 5 is a flowchart showing a detailed flow of comparison processing in step S302 in FIG. 3.

FIG. 5 is a flowchart showing a detailed flow of the comparison processing in step S302 in FIG. 3. In step S501, the program sequentially extracts items designated as comparison targets in FIG. 4 from the network instrument setting. When extraction of all comparison items is ended (step S502), it is determined that all comparison target items match, and the comparison processing is ended in step S506. If a comparison item is present, the setting information in the network instrument is compared with a corresponding item in the database 103 in step S503. If the pieces of setting information do not match, it is determined that comparison has failed, and the comparison processing is ended in step S505. If the pieces of information match as a result of comparison in step S504, the flow returns to extraction of the next comparison target item in step S501.

Figure 6:
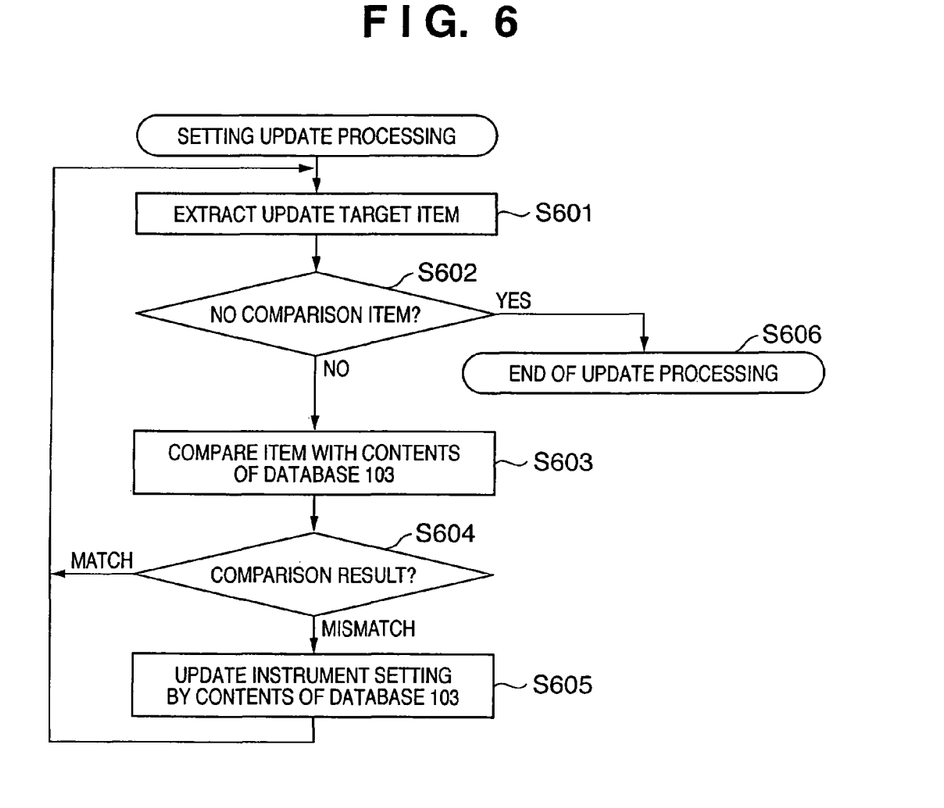
FIG. 6 is a flowchart showing a detailed flow of setting information update processing in step S304 in FIG. 3.

FIG. 6 is a flowchart showing a detailed flow of the setting information update processing in step S304 in FIG. 3. In step S601, the program sequentially extracts items designated as update targets from the network instrument setting. When extraction of all update items is ended (step S602), the update processing is ended in step S606. If a comparison item is present, the extracted set value of the network instrument is compared in step S603 with the set value of the designated item of the network instrument, which is saved in the database 103. If the values match as a result of comparison (step S604), updating is unnecessary. Hence, the flow returns to extraction of the next update item in step S601. If the values do not match as a result of comparison, the designated set value in the network instrument is updated by the set value saved in the database 103 in step S605, and the flow returns to extraction of the next update item in step S601.

As described above, according to this embodiment, in managing a network instrument connected to a network, the setting information of the management target network instrument is stored in the instrument information database 103. The setting information of the network instrument is received and compared with the setting information stored in the instrument information database 103. If the setting information stored in the instrument information database 103 is different from that received from the network instrument as a result of comparison, the setting information stored in the instrument information database 103 is overwritten on the setting of the network instrument. With this processing, the setting information of the network instrument can effectively be managed. More specifically, when the setting information is changed on the network instrument side, the setting information can be restored to the original setting information stored on the host side, i.e., the setting change can be invalidated. Hence, careless or malicious change of setting of the management target instrument can be avoided.

SECOND EMBODIMENT

The second embodiment of the present invention will be described next. A host computer according to the second embodiment is basically the same as that of the first embodiment except it has a function of marking a management target network instrument. The same reference numerals as in the first embodiment denote the same parts in the second embodiment, and a description thereof will be omitted. Only different parts will be described below.

Figure 7:
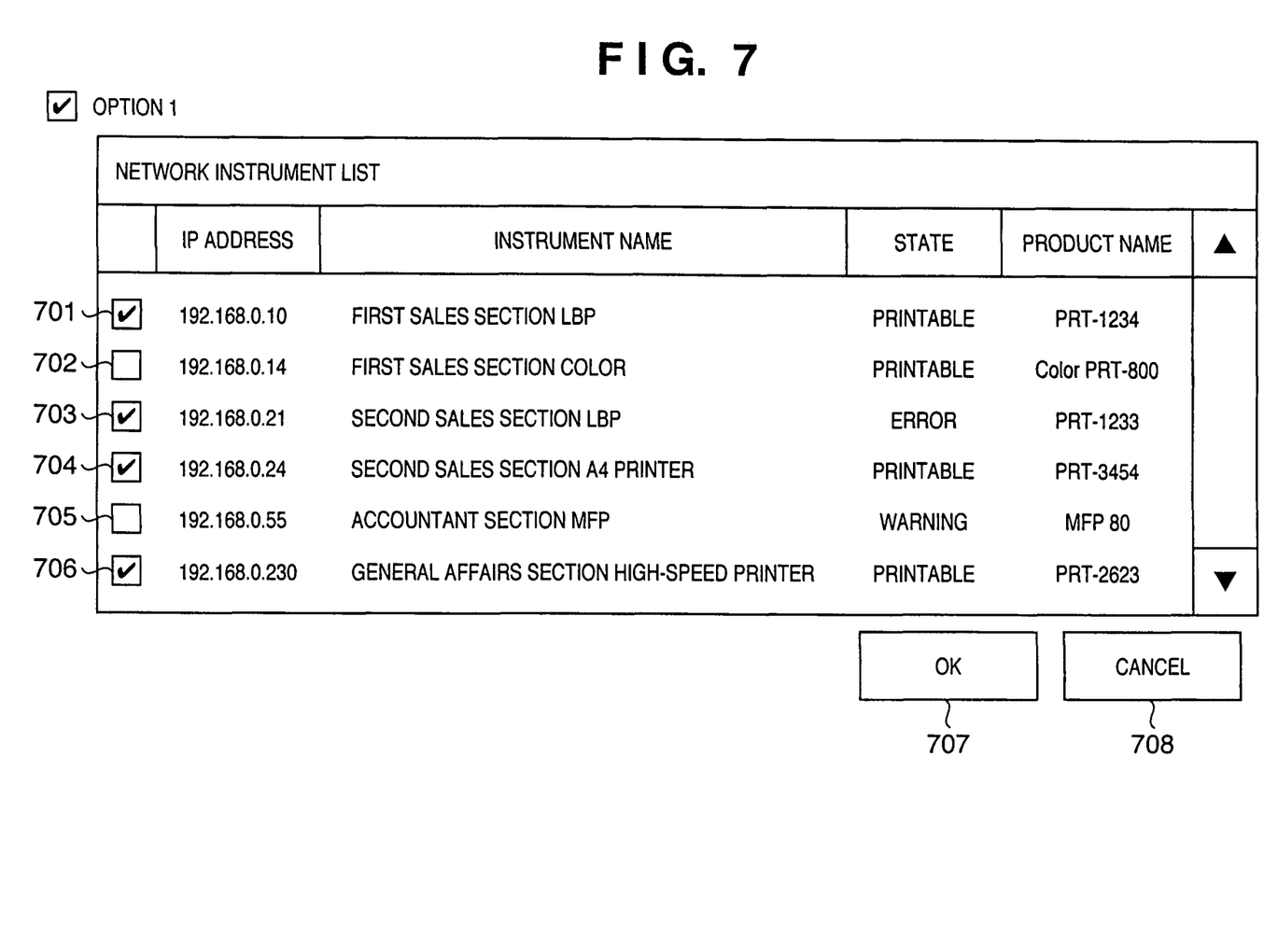
FIG. 7 is a view showing a window to select, from a list, a network instrument whose setting information should be updated with priority on the contents of an instrument information database by a host computer according to the second embodiment.

FIG. 7 shows an example of a window to select, from a list, a network instrument whose setting information should be updated with priority on the contents of an instrument information database 103 by an instrument management system application 102 according to the second embodiment. In this example, management target network instruments are assumed to be printers connectable to a network. In FIG. 7, network instruments 701 to 706 managed by the instrument management system application 102 are displayed as a list. The IP addresses, instrument names that can be set by the user, current instrument statuses, and product names of the network instruments are displayed. When a checkmark is placed in a check box at the left end of the list, the setting information of the checked network instrument is compared with setting information in the instrument information database 103. If the pieces of information are different, the setting information of the network instrument is updated by the setting information stored in the instrument information database 103. In the example shown in FIG. 7, the network instruments 701, 703, 704, and 706 are selected as update target instruments with priority on the database.

When an "OK" button 707 is clicked on in this state, the contents of each check box are saved in a corresponding field in the instrument information database 103. When a cancel button 708 is clicked on, the window is closed without any processing.

Figure 8:
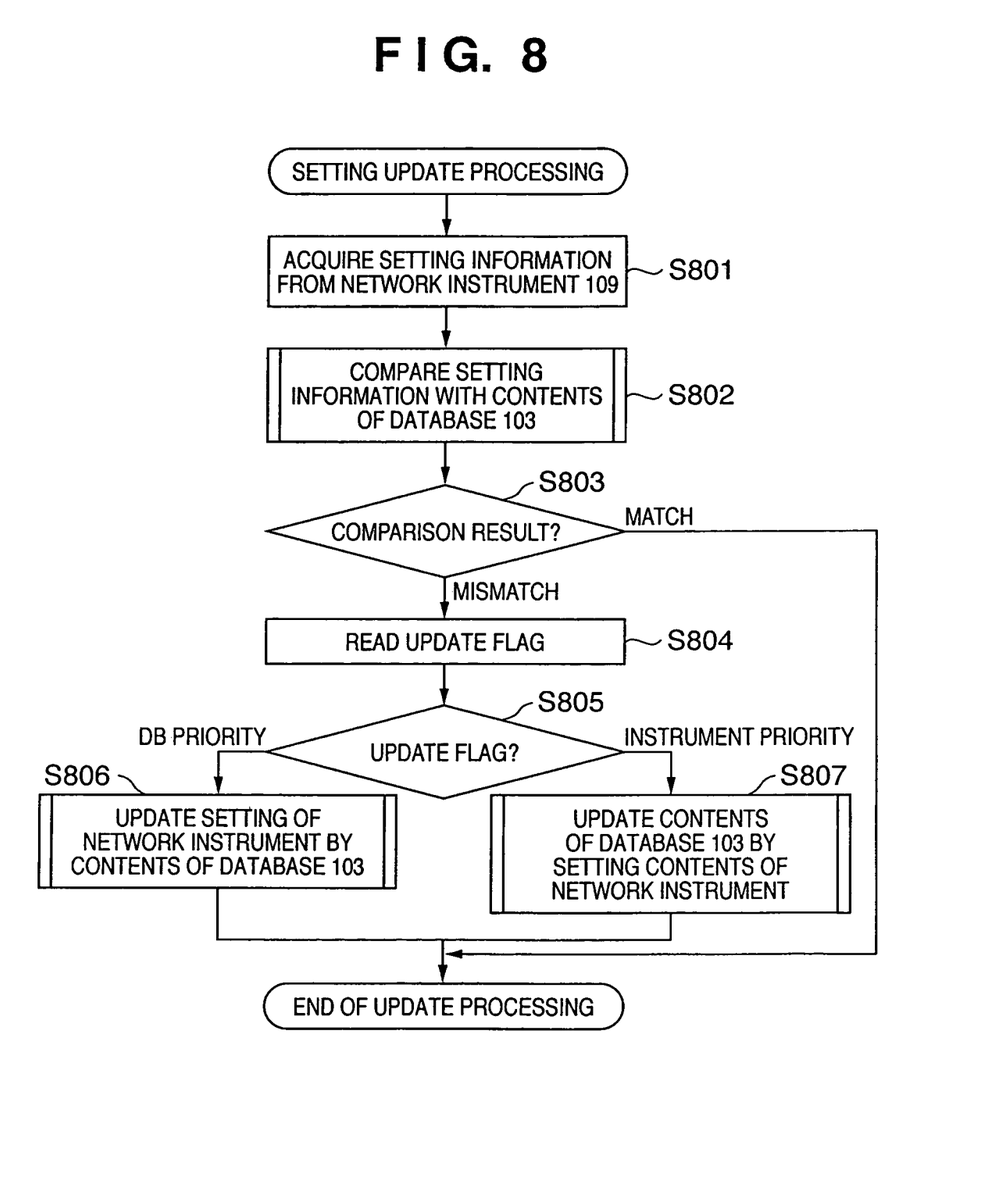
FIG. 8 is a flowchart showing the flow of setting information update processing for a network instrument by the host computer according to the second embodiment.

FIG. 8 is a flowchart showing the flow of setting information update processing for a network instrument by the instrument management system application 102 according to the second embodiment.

In the setting update processing, in step S801, the setting information of a network instrument to be managed is acquired by using a protocol such as SNMP. In step S802, the acquired setting information of the network instrument is compared with the setting information of the network instrument, which is stored in the instrument information database 103. If the pieces of setting information match as a result of comparison (S803), the setting update processing is ended. If the pieces of setting information do not match as a result of comparison, an update flag for the network instrument set in FIG. 7 is acquired from the instrument information database 103 in step S804. In step S805, the contents of the update flag are checked. If the network instrument is a network instrument with DB priority, i.e., with a checkmark placed in the check box in FIG. 7, the setting information of the network instrument is updated by the setting information of the network instrument, which is stored in the instrument information database 103 in step S806. Conversely, if the network instrument is a network instrument with instrument priority, i.e., without a checkmark in the check box in FIG. 7, the setting information stored in the instrument information database 103 is updated by the setting information of the network instrument in step S807.

Figure 9:
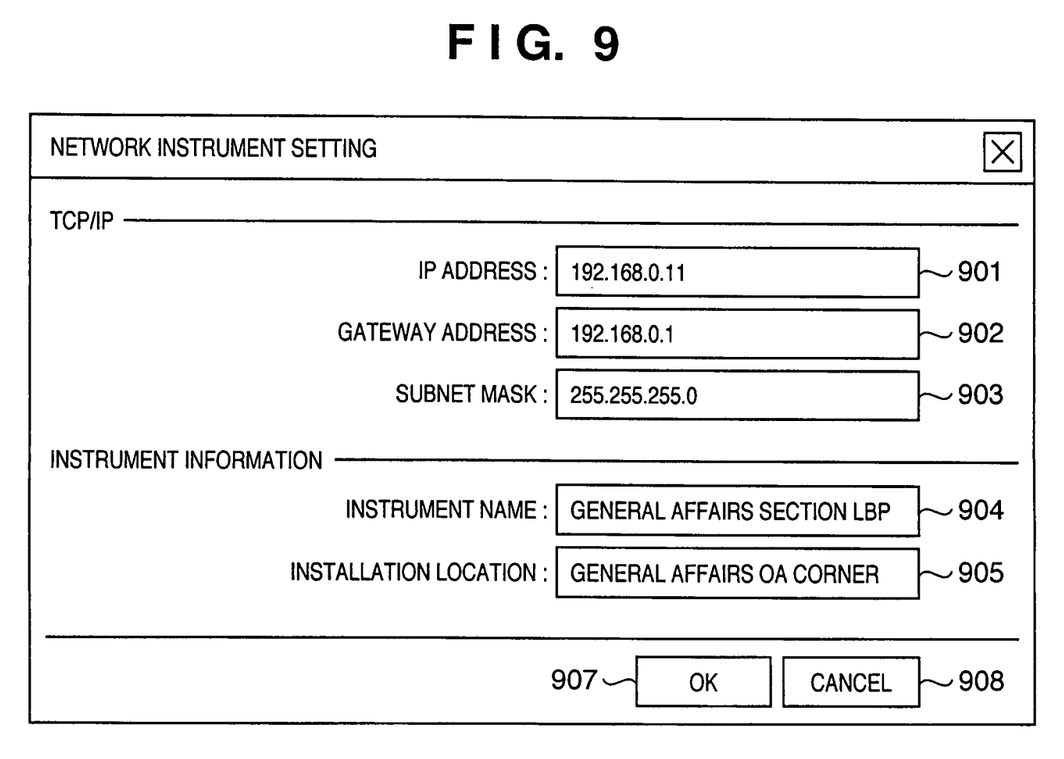
FIG. 9 is a view showing a window to change the setting information of a network instrument by the host computer according to the second embodiment.

FIG. 9 is a view showing an example of a window to change the setting information of a network instrument by the instrument management system application 102 according to the second embodiment. Referring to FIG. 9, reference numeral 901 denotes an IP address; 902, a gateway address; 903, a subnet mask; and 904 and 905, input controls to display and edit an instrument name that can be set by the user and an installation location information that can be set by the user, respectively. When the user instructs to edit the setting information of a network instrument, the instrument management system application 102 writes current setting information in each input control value and opens the window.

When the user inputs change contents in the input controls and clicks on an "OK" button 907, the instrument management system application 102 sets the changed item contents in the network instrument and simultaneously updates the contents of the instrument information database. When a "cancel" button 908 is clicked on, the window is closed without any processing.

When the "OK" button is clicked on, the instrument management system application 102 determines that the network instrument is under its management and places a mark to give priority on the contents of the instrument information database 103 with regard to the network instrument.

As described above, according to this embodiment, whether to give priority on the contents of the instrument information database 103 or setting of a network instrument itself can be set for each network instrument.

OTHER EMBODIMENT

The embodiments of the present invention have been described above in detail. The present invention can be applied to a system including a plurality of devices or an apparatus including a single device.

The present invention is also achieved even by supplying a program which implements the functions of the above-described embodiments to the system or apparatus directly or from a remote site and causing the system or apparatus to read out and execute the supplied program code. Hence, the program code itself, which is installed in a computer to implement the functional processing of the present invention by the computer, is also incorporated in the technical scope of the present invention.

In this case, the program can take any form such as an object code, a program to be executed by an interpreter, or script data to be supplied to the OS as long as the functions of the program can be obtained.

As a recording medium to supply the program, for example, a Floppy® disk, hard disk, optical disk, magnetooptical disk, MO, CD-ROM, CD-R, CD-RW, magnetic tape, nonvolatile memory card, ROM, or DVD (DVD-ROM or DVD-R) can be used.

As another program supply method, a client computer may be connected to a homepage on the Internet by using a browser in the client computer, and the computer program itself of the present invention or a compressed file containing an automatic install function may be downloaded from the homepage to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program by using the key information, and install the program in the computer.

The functions of the above-described embodiments are implemented not only when the readout program is executed by the computer but also when, e.g., the OS running on the computer performs part or all of actual processing on the basis of the instructions of the program.

The functions of the above-described embodiments are also implemented when the program read out from the recording medium is written in the memory of a function expansion board inserted into the computer or a function expansion unit connected to the computer, and the CPU of the function expansion board or function expansion unit performs part or all of actual processing on the basis of the instructions of the program.

According to the present invention, the setting information of a network instrument can effectively be managed. More specifically, when the setting information is changed on the network instrument side, the setting information can be restored to original setting information stored on the management apparatus side. Hence, careless or malicious change of setting of the management target instrument can be avoided. The setting information of the network instrument can effectively be managed.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for managing a plurality of printers connected to a network, comprising:
   a database which stores first setting information of the plurality of printers as a management target, wherein the first setting information includes at least one of network settings of a printer, a name of a printer and location information at which a printer is located;
   a priority setting unit which gives a priority to either the first setting information or setting information set on a printer via a user interface, for each of the plurality of printers;
   a receiving unit which receives second setting information set on a target printer from the target printer;
   a comparing unit which compares the first setting information with the received second setting information;
   a setting restore unit which controls to set the target printer with the first setting information without using the received second setting information, if the first setting information is different from the received second setting information as a result of the comparison made by the comparing unit and if the first setting information is given the priority by the priority setting unit, so that the second setting information set on the target printer is automatically restored by the first setting information; and
   a database update unit which overwrites the first setting information with the received second setting information, if the first setting information is different from the received second setting information as a result of the comparison made by the comparing unit and if the second setting information set on the target printer is given the priority by the priority setting unit, so that the first setting information is updated by the received second setting information without updating the second setting information set on the target printer by using the first setting information.

2. The apparatus according to claim 1, further comprising a comparison item designation unit which individually designates items of the first and second setting information to be compared by the comparing unit and overwritten by the setting restore unit or the database update unit.

3. The apparatus according to claim 1, further comprising a designation unit which individually designates items of the first and second setting information to be overwritten by the setting restore unit or the database update unit.

4. The apparatus according to claim 1, further comprising a setting change unit which changes the second setting information, wherein the priority setting unit gives priority to the first setting information, as the second setting information is to be set on the target printer whose second setting information is changed by the setting change unit.

5. An information processing method of managing a plurality of printers connected to a network, comprising the steps of:
    storing in a database first setting information of the plurality of printers as a management target, wherein the first setting information includes at least one of network settings of a printer, a name of a printer and location information at which a printer is located;
    giving a priority to either the first setting information or setting information set on a printer via a user interface, for each of the plurality of printers;
    receiving second setting information set on a target printer from the target printer;
    comparing the first setting information with the received second setting information;
    controlling to set the target printer with the first setting information without using the received second setting information, if the first setting information is different from the received second setting information as a result of the comparison made in the comparing step and if the first setting information is given the priority in the giving priority step, so that the second setting information set on the target printer is automatically restored by the first setting information; and
    overwriting the first setting information with the received second setting information, if the first setting information is different from the second setting information set on the target printer as a result of the comparison made in the comparing step and if the second setting information set on the target printer is given the priority in the giving priority step, so that the first setting information is updated by the received second setting information without updating the second setting information set on the target printer by using the first setting information.

6. An information processing program stored on a non-transitory computer readable medium, for causing a computer to manage a plurality of printers connected to a network, the program causing a computer to execute a method, the method comprising steps of:
    storing in a database first setting information of the plurality of printers as a management target, wherein the first setting information includes at least one of network settings of a printer, a name of a printer and location information at which a printer is located;
    giving a priority to either the first setting information or setting information set on a printer via a user interface, for each of the plurality of printers;
    receiving second setting information set on a target printer from the target printer;
    comparing the first setting information with the received second setting information;
    controlling to set the target printer with the first setting information without using the received second setting information, if the first setting information is different from the received second setting information as a result of the comparison made in the comparing step and if the first setting information is given the priority in the giving priority step, so that the second setting information set on the target printer is automatically restored by the first setting information; and
    overwriting the first setting information with the received second setting information, if the first setting information is different from the second setting information set on the target printer as a result of the comparison made in the comparing step and if the second setting information set on the target printer is given the priority in the giving priority step, so that the first setting information is updated by the received second setting information without updating the second setting information set on the target printer by using the first setting information.

7. The apparatus according to claim 1, further comprising an execution timing control unit which controls a timing of overwriting of the second setting information by the setting restore unit, wherein the execution timing control unit controls to execute the overwriting of the second setting information at a time designated by a user, or repeatedly at a time interval set by a user or a system.

* * * * *